US009296416B2

(12) United States Patent
Krueger

(10) Patent No.: US 9,296,416 B2
(45) Date of Patent: Mar. 29, 2016

(54) METHOD FOR OPERATING A STEERING APPARATUS OF A MOTOR VEHICLE COMPRISING AN ELECTROMECHANICAL STEERING-ASSISTANCE DEVICE

(71) Applicant: Dr. Ing. h.c.F. Porsche Aktiengesellschaft, Stuttgart (DE)

(72) Inventor: Kim Michael Krueger, Neulingen (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 14/548,328

(22) Filed: Nov. 20, 2014

(65) Prior Publication Data

US 2015/0149038 A1 May 28, 2015

(30) Foreign Application Priority Data

Nov. 26, 2013 (DE) .......................... 10 2013 113 027

(51) Int. Cl.
*B62D 12/00* (2006.01)
*B62D 11/00* (2006.01)
*B62D 6/00* (2006.01)
*B62D 5/04* (2006.01)

(52) U.S. Cl.
CPC .............. *B62D 5/0472* (2013.01); *B62D 6/008* (2013.01)

(58) Field of Classification Search
CPC .................................................... B25D 5/0472
USPC ........ 701/41, 42, 70; 180/443, 444, 446, 412, 180/415; 340/465
See application file for complete search history.

(56) References Cited

U.S. PATENT DOCUMENTS

| 8,744,682 B2* | 6/2014 | Oblizajek | B62D 5/0472 |
| | | | 180/412 |
| 2007/0216123 A1* | 9/2007 | Gustavsson | B62D 7/222 |
| | | | 280/89 |
| 2009/0000857 A1* | 1/2009 | Sugiyama | B62D 5/0472 |
| | | | 180/444 |

FOREIGN PATENT DOCUMENTS

| DE | 102008036001 A1 | 2/2010 |
| JP | H 10324262 A | 12/1998 |
| JP | 2002249058 A | 9/2002 |

* cited by examiner

*Primary Examiner* — Adam Tissot
(74) *Attorney, Agent, or Firm* — Leydig, Voit & Mayer, Ltd.

(57) ABSTRACT

A method for operating a steering apparatus of a motor vehicle includes detecting interference-induced vibrations which act on a torsion bar of the steering apparatus and analyzing a frequency and amplitude of the interference-induced vibrations. A steering-stabilization function of the steering-assistance device is activated when a limit value for the amplitude of the interference-induced vibrations is exceeded. A drive signal is provided, with the steering stabilization function, for an electric motor of the steering-assistance device, so that the electric motor generates a compensation torque $M_{bar}$ which acts on the torsion bar and at least partially counteracts the interference-induced vibrations. An indicator is formed from the frequency and the amplitude of the interference-induced vibrations and the carriageway induced vibrations are distinguished from vibrations caused by instabilities in the steering apparatus. The drive signal is generated for the electric motor in a vibration-dependent manner by combining the indicator with the steering-stabilization function.

9 Claims, 2 Drawing Sheets

METHOD FOR OPERATING A STEERING APPARATUS OF A MOTOR VEHICLE COMPRISING AN ELECTROMECHANICAL STEERING-ASSISTANCE DEVICE

CROSS REFERENCE TO RELATED APPLICATIONS

Priority is claimed to German Patent Application No. DE 10 2013 113 027.5, filed on Nov. 26, 2013, the entire disclosure of which is hereby incorporated by reference herein.

FIELD

The present invention relates to a method for operating a steering apparatus of a motor vehicle comprising an electromechanical steering-assistance device, in which method interference-induced vibrations which act on a torsion bar of the steering apparatus are detected, and the frequency and amplitude of the interference-induced vibrations are analyzed, wherein, when a limit value for the amplitude of the interference-induced vibrations is exceeded, a steering-stabilization function of the steering-assistance device is activated, said steering-stabilization function providing a drive signal for an electric motor of the steering-assistance device, so that the electric motor generates a compensation torque which acts on the torsion bar and at least partially counteracts the interference-induced vibrations.

BACKGROUND

Steering apparatuses for steering motor vehicles are often equipped with steering-assistance devices in order to reduce the force which is necessary for operating a steering wheel of the steering apparatus, in particular when the motor vehicle is stationary or travelling at low speeds. In addition to hydraulically operated steering-assistance devices, the prior art also discloses electrical steering-assistance devices which can be realized in an electrohydraulic or electromechanical manner. An electromechanical steering-assistance device has an electric actuating drive which acts on a torsion bar of the steering apparatus and can be driven by means of a control device. As a result, the actuating motor is able to provide auxiliary forces in order to assist steering wheel movements by the driver in this way.

The steering apparatus of a motor vehicle is subject to numerous interfering influences during operation, it being possible for these interfering influences to have a disadvantageous effect on the steering and traveling behavior of the motor vehicle. In the case of an electromechanical steering-assistance device, high-frequency vibrations with a relatively large amplitude can be produced on the torsion bar if there is no suitable steering-stabilization function. This effect occurs particularly when the torsion bar of the steering apparatus is relieved of loading (for example when steering back with an only low manual torque exerted by the driver). An existing steering-stabilization function which is dependent on the torsion bar torque and can be implemented, in particular, in the control device for the actuating motor can effectively prevent vibrations of this kind, but at the same time suppresses excitation phenomena which act on the steering apparatus on account of the condition of the carriageway. This in turn results in insufficient steering feedback which can be perceived by the driver and can have a disadvantageous influence on the steering sensation. It would therefore be desirable for the steering-stabilization function to be activated only when actual instabilities occur.

DE 10 2008 036 001 A1 discloses a method of the kind mentioned in the introductory part for operating a steering apparatus comprising an electric steering-assistance device. In this method, interference variables which are caused by the condition of the carriageway and act on the steering apparatus are ascertained by a frequency analysis. When the ascertained interference variable exceeds a prespecified amplitude, the electric steering-assistance device generates a compensation torque which can counteract an interference-induced torque which is generated by the interference variable and acts on the steering apparatus—in particular on the steering wheel.

SUMMARY

In an embodiment, the present invention provides a method for operating a steering apparatus of a motor vehicle that includes an electromechanical steering-assistance device. The method includes detecting interference-induced vibrations which act on a torsion bar of the steering apparatus and analyzing a frequency and amplitude of the interference-induced vibrations. A steering-stabilization function of the steering-assistance device is activated when a limit value for the amplitude of the interference-induced vibrations is exceeded. A drive signal is provided, with the steering stabilization function, for an electric motor of the steering-assistance device, so that the electric motor generates a compensation torque $M_{bar}$ which acts on the torsion bar and at least partially counteracts the interference-induced vibrations. An indicator is formed from the frequency and the amplitude of the interference-induced vibrations and the carriageway induced vibrations are distinguished from vibrations caused by instabilities in the steering apparatus. The drive signal is generated for the electric motor in a vibration-dependent manner by combining the indicator with the steering-stabilization function.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
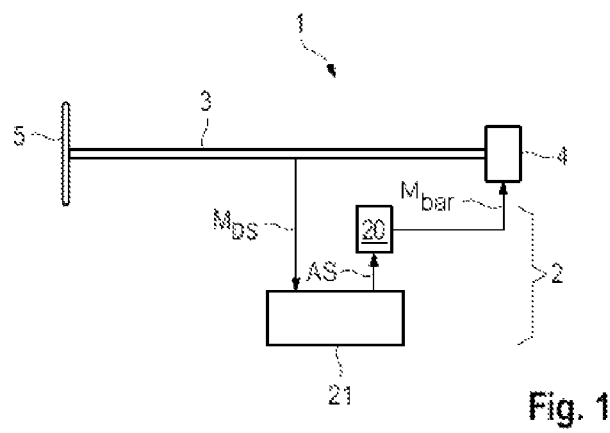
FIG. 1 shows a schematically highly simplified illustration of a steering apparatus of a motor vehicle comprising an electromechanical steering-assistance device.

In an embodiment, the present invention provides a method for operating a steering apparatus of a motor vehicle comprising an electromechanical steering-assistance device, which method allows the steering apparatus to be stabilized as required.

In an embodiment of the invention, an indicator is formed from the frequency and the amplitude of the interference-induced vibrations, the carriageway-induced vibrations are distinguished from vibrations which are caused by instabilities in the steering apparatus, and the drive signal for the electric motor is generated in a vibration-dependent manner by combining, in particular by multiplying, the indicator with/by the steering-stabilization function. In the method according to the invention, the frequency and the amplitude of the torsion bar vibrations are ascertained and combined with one another such that an indicator can be formed therefrom, it being possible to distinguish between desired vibrations (feedback based on the condition of the carriageway) and undesired vibrations, which are caused by instabilities, by means of said indicator. The steering stabilization becomes active only when vibrations which are caused by instabilities occur. If desired vibrations of the torsion bar which are caused by the influences of the carriageway are detected, the steering stabilization is preferably not activated. A particular advantage of the method according to the invention is that the steering stabilization can not only be activated or deactivated as desired by providing the indicator, but rather can also be scaled, in particular when different (that is to say desired and undesired) vibrations of the torsion bar are partially superimposed.

A particularly preferred embodiment proposes that, in order to form the indicator, the frequency and amplitude of a torsion bar torque of the torsion bar of the steering apparatus are determined The torsion bar torque can be easily detected by measurement and therefore constitutes a measurement variable which is also relatively simple to process for analysis purposes, in order to detect and to analyze the interference-induced vibrations of the torsion bar.

In order to remove the signal offset, a particularly preferred embodiment proposes that the torsion bar torque is differentiated, and zero crossings in the derivative of the torsion bar torque are detected, the frequency of the vibrations of the torsion bar being calculated from said zero crossings, and also the maximum of a magnitude of the derivative of the torsion bar torque is determined, and the indicator is formed by combining, in particular by multiplying, the frequency with/by the maximum of the magnitude of the derivative of the torsion bar torque. It has been found that an indicator which is robust in every sense can be provided for distinguishing between desired, carriageway-induced vibrations and undesired vibrations, which are caused by instabilities, by combining the frequency with the maximum of the magnitude of the derivative of the torsion bar torque.

In order to carry out the method presented here in a particularly rapid manner, it may be expedient for the frequencies of half-vibrations of the torsion bar to be ascertained from in each case two adjacent zero crossings of the derivative of the torsion bar torque. It has been found that even the analysis of half-vibrations for indicator formation is sufficient in order to be able to distinguish between desired and undesired vibrations in the sense explained above. Therefore, it may likewise be expedient for the maximum of the magnitude of the derivative of the torsion bar torque between the adjacent zero crossings (which are already used for the frequency analysis) to be determined.

In order to be able to further accelerate the formation of the indicator at comparatively high torsion bar speeds, a particularly preferred embodiment proposes that the indicator is formed from a first indicator component, which is formed from the combination, in particular the multiplication, of the frequency with/by the maximum of the magnitude of the derivative of the torsion bar torque, and from at least one second indicator component which is determined from the size of the maximum magnitude of the derivative of the torsion bar torque. Without this measure, at least one half-period would otherwise be required for forming the indicator. The two indicator components can be combined with one another for the purpose of forming the indicator, in particular by addition.

In order to suppress or at least substantially suppress high-frequency interference components in the measurement signal of the torsion bar torque, which could lead to difficulties during signal evaluation, a particularly advantageous embodiment proposes that the torsion bar torque is low-pass-filtered before the frequency and/or the amplitude are/is determined This low-pass filtering further has the advantage of reducing the quantity of data which is to be processed.

In order to further improve the quality of the indicator I, a particularly preferred embodiment comprises the option of the indicator being post-processed before being combined with the steering-stabilization function, in particular by saturation and/or limitation and/or defining the minimum/maximum value.

With reference to FIG. 1, a steering apparatus 1 of a motor vehicle, which has an electromechanical steering-assistance device 2, comprises a steering wheel 5 which is connected to a torsion bar 3 which, for its part, is mechanically coupled to a steering mechanism 4. Rotary movements of the steering wheel 5 which are exerted by the driver are transmitted in a known manner via the torsion bar 3 to the steering mechanism 4 which, for its part, is mechanically operatively connected to the steerable wheels of the motor vehicle, said wheels not being explicitly illustrated here, so that the motor vehicle can be steered in the desired manner.

The electromechanical steering-assistance device 2 comprises an electric motor 20 which can be operated in a program-controlled manner by means of a control device 21 which is connected to said electric motor. The electric motor 20 is able to generate a torque which acts on a steering mechanism 4 and is directed such that it can assist the mechanical rotary movements of the steering wheel 2 which are made by the driver of the motor vehicle.

Figure 2:
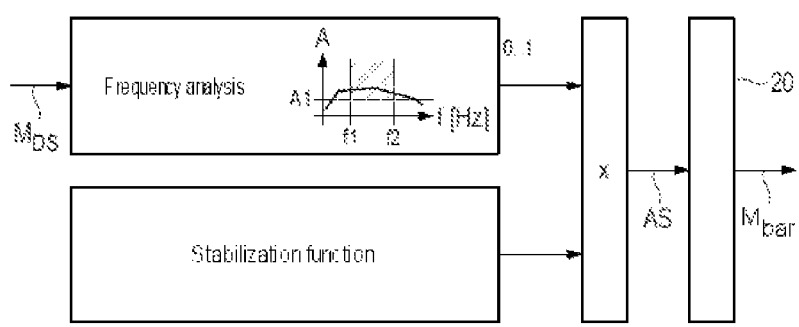
FIG. 2 shows a block diagram which illustrates the basic functional principle of a method for operating the electromechanical steering device of a motor vehicle.

With further reference to the block diagram which is illustrated in FIG. 2, the basic principle of a method for operating the steering device 1 comprising the electromechanical steering-assistance device 2 is intended to be explained in greater detail below. A torsion bar torque $M_{DS}$ of the torsion bar 3, which is a measure of interference-induced vibrations of the torsion bar 3 which are induced by instabilities and/or by the condition of the carriageway, is detected by the control device 21 of the electric motor 20 with the aid of torque-detection means. The control device 21 is designed such that it can detect and analyze the frequency and the amplitude of the interference-induced vibrations and can form an indicator I therefrom in such a way that carriageway-induced vibrations—and therefore vibrations which are desired in the sense of optimized steering feedback—can be distinguished from undesired vibrations which are caused by instabilities. By combining the indicator I with a steering-stabilization function which is implemented in the control device 21, it is possible to provide the electric motor 20 with an electrical drive signal AS for generating a compensation torque $M_{bar}$ which acts on the torsion bar 3 by means of the steering mechanism 4 and which can at least partially counteract the vibration-induced vibrations. Therefore, by forming the indicator I and combining it with the steering-stabilization function, a scaled drive signal AS can be provided for the electric motor 20 for the purpose of generating the compensation torque $M_{bar}$ as required and depending on the situation. For combination with the steering-stabilization function by multiplication, the indicator I can advantageously be standardized to a possible value range of between 0 and 1, where I=0 means that no steering stabilization is performed, and I=1 means that the steering-stabilization function is fully activated. When 0<I<1, the steering-stabilization function is only partially active. These intermediate values of the indicator between the 2 extreme values 0 and 1 therefore allow the steering-stabilization function to be scaled as required depending on the type and intensity of interference-induced vibrations. A significant advantage of the approach described here is that the vibrations of the torsion bar 3 of the steering apparatus 1 are not rigorously suppressed. Instead, vibration excitation phenomena which act on the steering apparatus 1 on account of the condition of the carriageway are not suppressed by the method described here, but rather furthermore generate steering feedback which can be perceived by the driver and has a positive influence on the steering sensation.

Figure 3:
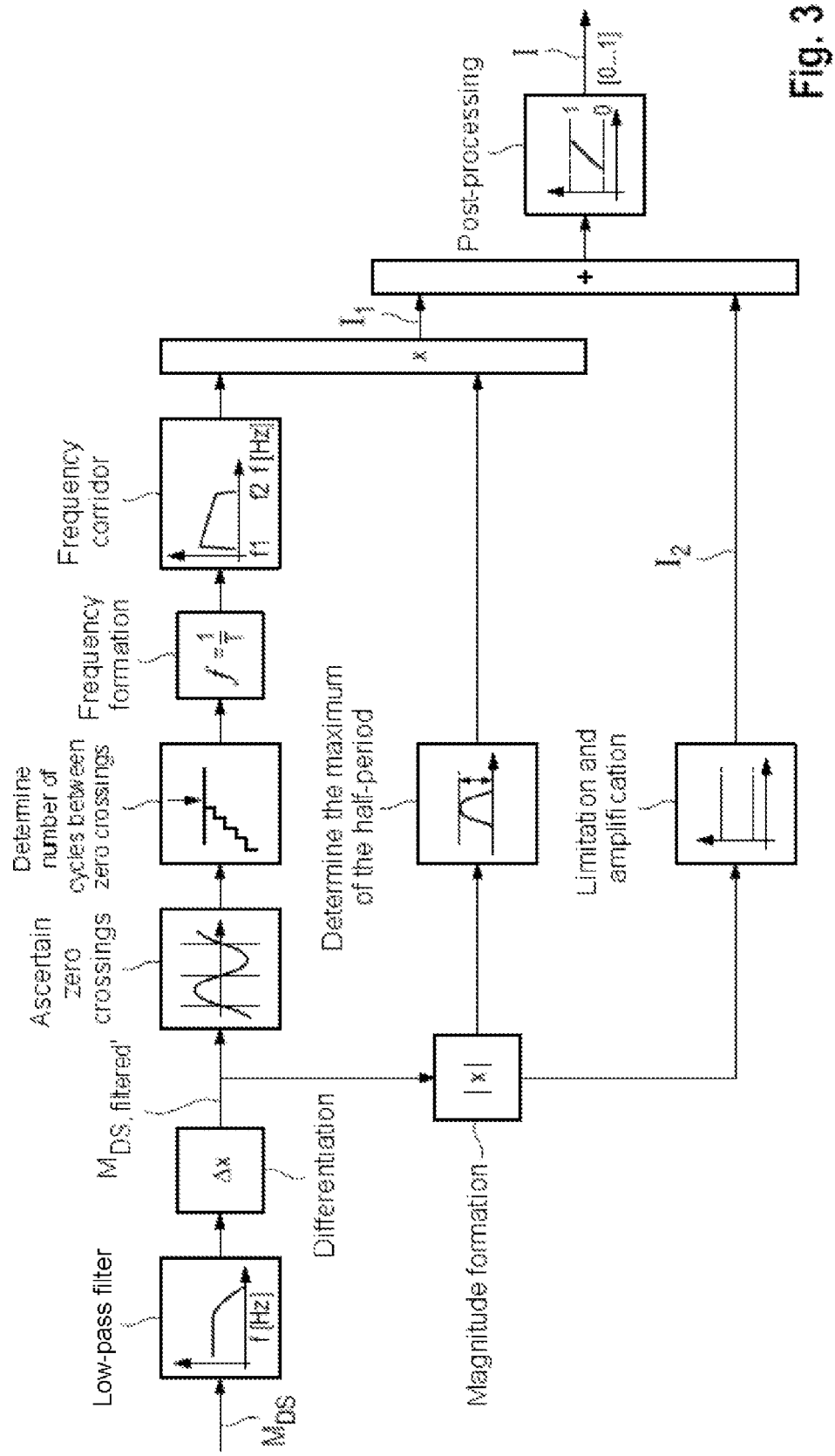
FIG. 3 shows a block diagram which illustrates details of the method.

Details of the frequency analysis of the torsion bar torque $M_{DS}$ of the torsion bar 3 are to be explained below with further reference to FIG. 3. In a first step, the torsion bar torque $M_{DS}$ of the torsion bar 3 is initially low-pass filtered to a desired low-frequency range. As a result, the frequency band which is to be analyzed is limited in a suitable manner. The low-pass-filtered torsion bar torque $M_{DS,\,filtered}$ which is obtained in this way is differentiated in a next step, so that an offset of the torsion bar torque $M_{DS}$ can be eliminated in an advantageous manner and the further frequency analysis is not corrupted or negatively influenced in any other way by the offset. Zero crossings of the derivative $M_{DS,\,filtered}$ (with respect to time) which is obtained by the differentiation are determined in a first analysis path. The frequency is determined in such a way that, in each case, the number of model cycles between the two last zero crossings of the derivative $M_{DS,\,filtered}$ of the low-pass-filtered torsion bar torque $M_{DS,\,filtered}$ is determined and converted into a frequency. The frequency of the last half-vibration of the torsion bar 3 is obtained as a result.

The magnitude of the derivative $M_{DS,\,filtered}$ of the low-pass-filtered torsion bar torque $M_{DS,\,}$ filtered is determined in a second analysis path. The maximum of the magnitude of the derivative $M_{DS,\,filtered}$ of the low-pass-filtered torsion bar torque $M_{DS,\,filtered}$ between the two last zero crossings which have already been selected for the frequency analysis is also determined This maximum of the magnitude of the derivative $M_{DS,\,filtered}$ of the low-pass-filtered torsion bar torque $M_{DS,\,filtered}$ forms a measure of the amplitude of the derivative of the last half-vibration of the torsion bar 3.

A first indicator component I1 can be formed from the maximum of the magnitude of the derivative $M_{DS,\,filtered}$ of the low-pass-filtered torsion bar torque $M_{DS,\,filtered}$ by multiplication with the frequency, which is determined in the above-described manner, of the last half-vibration, wherein the desired frequency band can advantageously be defined between a frequency f1 and a frequency f2 by means of a fixed or alternatively adjustable characteristic curve. It was already possible to distinguish between desired, carriageway-induced vibrations of the torsion bar 3 and undesired vibrations, which are caused by instabilities, of the torsion bar 3 by means of the first indicator component I1, in order to generate a required compensation torque $M_{bar}$ by combination with the steering-stabilization function, which is implemented in the control device 21, for the purpose of forming the drive signal AS for the electric motor. In this case, I=I1 for the indicator.

In order to be able to effectively increase the reaction rate of the control device 6, in particular at high torsion bar speeds, it is possible in the exemplary embodiment shown here to form a second indicator component I2 from the magnitude of the derivative $M_{DS,\,filtered}$ of the low-pass-filtered torsion bar torque $M_{DS,\,filtered}$, said second indicator component being added to the first indicator component I1 so that: I=I1+I2 for the indicator. The indicator I can be combined with the steering-stabilization function by multiplication in order to generate the electrical drive signal AS in the above-described manner, so that the control device 21 can drive the electric motor 20 which can generate the compensation torque $M_{bar}$, which acts on the torsion bar 3, as required. Without this additional additive component I2, at least one half-period would always be required for detecting the vibration.

In order to further improve the quality of the indicator I, it is optionally possible for the indicator I to be post-processed before being combined with the steering-stabilization function, in particular by saturation, limitation (so-called "rate limiting") or defining the minimum value/maximum value.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for operating a steering apparatus of a motor vehicle that includes an electromechanical steering-assistance device, the method comprising:
   detecting interference-induced vibrations which act on a torsion bar of the steering apparatus;
   analyzing a frequency and amplitude of the interference-induced vibrations;
   activating a steering-stabilization function of the steering-assistance device when a limit value for the amplitude of the interference-induced vibrations is exceeded;
   providing, by the steering stabilization function, a drive signal (AS) for an electric motor of the steering-assistance device, so that the electric motor generates a compensation torque $M_{bar}$ which acts on the torsion bar and at least partially counteracts the interference-induced vibrations;
   forming an indicator (I) from the frequency and the amplitude of the interference-induced vibrations;
   distinguishing carriageway-induced vibrations from vibrations caused by instabilities in the steering apparatus; and
   generating the drive signal (AS) for the electric motor in a vibration-dependent manner by combining the indicator (I) with the steering-stabilization function wherein the frequency and amplitude of a torsion bar torque ($M_{DS}$) of the torsion bar of the steering apparatus are determined so as to form the indicator (I), and wherein the torsion bar torque ($M_{DS}$) is differentiated, and zero crossings in the derivative of the torsion bar torque ($M_{DS}$) are detected, the frequency of the vibrations of the torsion bar being calculated from said zero crossings, and also the maximum of a magnitude of the derivative of the torsion bar torque ($M_{DS}$) is determined, and the indicator (I) is formed by combining the frequency with the maximum of the magnitude of the derivative of the torsion bar torque ($M_{DS}$).

2. The method as recited in claim 1, wherein the indicator (I) is combined with the steering-stabilization by multiplying.

3. The method as recited in claim 1, wherein the frequency is combined with the maximum of the magnitude of the derivative of the torsion bar torque ($M_{DS}$) by multiplying.

4. The method as recited in claim 1, wherein the frequencies of half-vibrations of the torsion bar are ascertained from in each case two adjacent zero crossings of the derivative of the torsion bar torque ($M_{DS}$).

5. The method as recited in claim 4, wherein the maximum of the magnitude of the derivative of the torsion bar torque ($M_{DS}$) between the adjacent zero crossings is determined.

6. The method as recited in claim 1, wherein the indicator (I) is formed from a first indicator component (I1), which is formed from the combination, in particular the multiplication, of the frequency with/by the maximum of the magnitude of the derivative of the torsion bar torque ($M_{DS}$), and from at least one second indicator component (I2) which is determined from the size of the magnitude of the derivative of the torsion bar torque ($M_{DS}$).

7. The method as recited in claim 6, wherein the two indicator components (I1, I2) are added in order to form the indicator (I).

8. The method as recited in claim 1, wherein the torsion bar torque ($M_{DS}$) is low-pass-filtered before the frequency and/or the amplitude are/is determined.

9. The method a recited in claim 1, wherein the indicator (I) is post processed, before being combined with the steering-stabilization function, by at least one of saturation, limitation or defining the minimum/maximum value.

\* \* \* \* \*